United States Patent

Terrill et al.

[15] 3,680,200
[45] Aug. 1, 1972

[54] FLUXLESS ULTRASONIC SOLDERING OF ALUMINUM TUBES

[72] Inventors: James R. Terrill, Natrona Heights; Stanley F. Dzierski, Arnold, both of Pa.

[73] Assignee: Aluminum Company of America, Pittsburgh, Pa.

[22] Filed: Dec. 16, 1970

[21] Appl. No.: 98,742

[52] U.S. Cl. ...................29/500, 29/503, 285/287
[51] Int. Cl. ...........................................B23k 35/12
[58] Field of Search .........29/501, 503, 500; 285/287

[56] References Cited

UNITED STATES PATENTS

| | | | |
|---|---|---|---|
| 2,033,122 | 3/1936 | Cornell, Jr. | 29/503 X |
| 2,087,716 | 7/1937 | Banscher | 29/503 X |
| 2,094,495 | 9/1937 | Robinson et al. | 29/503 X |
| 2,397,400 | 3/1946 | Barwich | 29/503 UX |
| 2,426,650 | 7/1947 | Swian | 29/503 |
| 2,984,903 | 5/1961 | Dixon et al. | 29/503 X |
| 3,025,596 | 3/1962 | Ward et al. | 29/501 X |
| 3,266,136 | 8/1966 | Guthier | 29/503 X |
| 3,303,983 | 2/1967 | Patrick et al. | 29/503 X |
| 3,334,925 | 8/1967 | Joyne | 285/287 |
| 3,528,688 | 9/1970 | Steverson | 29/500 X |

Primary Examiner—John F. Campbell
Assistant Examiner—Ronald J. Shore
Attorney—Carl R. Lippert

[57] ABSTRACT

Aluminum tubes such as those employed in refrigeration and air conditioning systems can be soldered without flux using ultrasonic energy provided the joint configuration is properly controlled and the ultrasonic pluses are applied in a controlled positive fashion.

9 Claims, 2 Drawing Figures

PATENTED AUG 1 1972          3,680,200

INVENTORS.
JAMES R. TERRILL &
STANLEY F. DZIERSKI
By Carl R. Lippert
Attorney

FLUXLESS ULTRASONIC SOLDERING OF ALUMINUM TUBES

BACKGROUND AND STATEMENT OF THE INVENTION

Aluminum heat exchanger tubes in air conditioning and refrigeration units are joined by soldering or brazing techniques wherein a filler metal is melted and caused to flow into the annular gap between a male and female member to provide a socket type joint. The joint provides a sound hermetic seal thus assuring the integrity of the heat exchanger system. Normally, a chemically reactive liquid salt flux is employed to remove the oxide coating on the aluminum surfaces to allow the liquid joining alloy to wet the surfaces and fill the annular gap between the male and female members by capillary attraction. Typical fluxes include chloride containing inorganic fluxes and chloride-free organic fluxes which are well known in the aluminum joining arts. While these fluxes promote sound joints they create certain problems in cleaning flux residues which often requires extensive flushing of the joint both inside and outside. Fluxless techniques are available which, of course, eliminate the flux residue cleaning problem. One of these is the so-called "rub" soldering method wherein the members are mechanically rubbed at soldering temperature to disturb the oxide film and permit wetting by the molten filler alloy. This technique is quite tedious and completely impractical in some instances such as jigged multi-tube heat exchangers featuring return joints. Another technique offering promise is ultrasonic dip soldering in which ultrasonic energy is used to disturb the oxide film. However, techniques to date require immersion of both male and female members in an ultrasonic agitated bath of the molten filler alloy. After the pre-coating or "tinning" operation, the respective male and female members are engaged, heated to soldering temperature, and preferably twisted or otherwise mechanically rubbed to assure a sound joint. These steps are considered impractical in many commercial joining operations.

In accordance with the invention it has been found that critically controlling the fit of the respective male and female members facilitates achieving sound socket joints by insitu ultrasonic energy application provided the ultrasonic pulses are applied in a positive reciprocating fashion.

DETAILED DESCRIPTION

Figure 1:
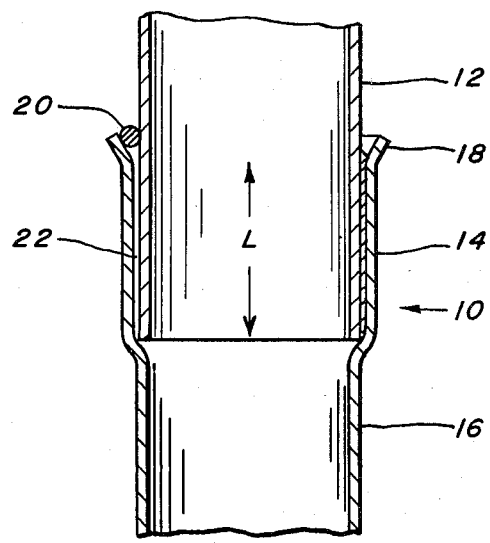
Figure 2:
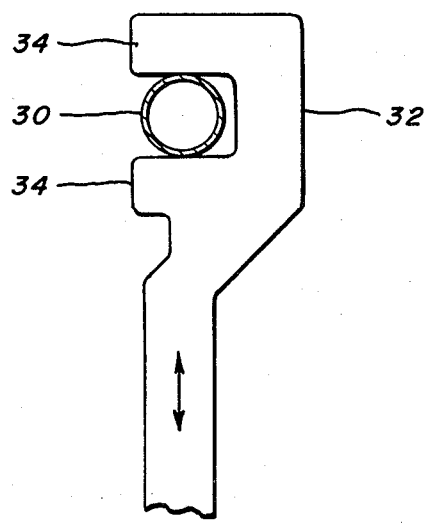

In the description reference is made to the drawings in which:

FIG. 1 is a cross sectional elevation of a socket joint;
FIG. 2 is a plan view showing an ultrasonic exiting means suitable in practicing the invention.

FIG. 1 illustrates socket type joint 10 of the type contemplated by the invention wherein male member 12 is within female member 14 which may be an expanded portion of a tube 16 of like dimensions with those of the male member 12. At the extremity of the female portion 14 is provided flared portion 18. Soldering is accomplished by positioning a solder alloy ring insert 20 around male member 12 and within the flared portion 18 of female member 14 and heating the joint to joining temperature by which is meant a temperature which melts the solder filler alloy 20 but not the tube members. In a proper joint the molten filler alloy flows into the gap 22 between the engaged male and female members to provide a sound joint.

In practicing the invention it is critical that the annular gap 22 between male and female members ranges from 0.002 inch to 0.006 inch around substantially the entire periphery. The normal gap in flux soldered joints is about 0.010 inch and the use of joints featuring such a gap precludes reliable fluxless ultrasonic soldering. In accordance with the invention it has been surprisingly found that reducing the gap facilitates insitu ultrasonic fluxless soldering to reliably provide sound joints. In practicing the invention the male and female members are not pre-coated with filler alloy in an ultrasonically excited filler metal bath as previously required in ultrasonic soldering. Instead, they are simply positioned in joining relationship with a solder filler insert 20 as shown in FIG. 1. The mated members can be crimped together in the lower extremity of the engagement to prevent filler metal from flowing through the joint while molten and under excitation. Such is preferred but not necessary for successful joining. The joint is brought to joining temperature and ultrasonic energy is applied to the joint site to facilitate the fluxless soldered joint which is then solidified. In practicing the invention it is essential that the ultrasonic energy application be of a positive reciprocating nature wherein the ultrasonic pulses are delivered in a positive multi-directional manner. Referring to FIG. 2 a suitable means for application of the ultrasonic energy is shown. In FIG. 2 the tube joint 30 is positioned within a channel like aperture in ultrasonic head 32 which is connected to an ultrasonic energy source not shown. The fit between the prongs 34 of the head 32 and the joint 30 should be such as to assure positive engagement on opposite sides of the joint. This does not require a critical fit-up between the joint and the opening in the head but merely that opposite sides of the joint are in contact with the head. This is readily accomplished by providing a gap, for instance one sixty-fourth or one thirty-second inch between the inner faces of the prongs 34 and the outer faces of joint 30 and slightly tilting the head 32 to assure contact on both sides of the joint 30. When the ultrasonic head 32 is reciprocated the pulses are positively imparted to the joint in more than one direction described as a collapsing bell-mode excitation and it has been found that this multi-directional positive ultrasonic pulse excitation together with the critical annular gap described above combine to surprisingly facilitate the production of sound solder joints without pre-coating of filler alloy and without the use of a chemical flux. It is believed that such is effected by causing the molten joining alloy to cavitate thereby progressively disrupting and disturbing the oxide film on the male and female members such that they are wetted by the molten alloy which thus advances along the gap 22 to complete the joint. It is preferred that the ultrasonic energy pulses be applied in a substantially horizontal direction by which is meant within 20° of a horizontal plane. While the ultrasonic pulse head 32 can be applied to the male portion above the joint or the female portion beneath the joint, it is preferred that it be applied to the joint by which is meant the engaged length L of the male and female members constituting the socket joint.

The practice of the invention contemplates that the tube members being joined be positioned with the axes in a substantially vertical orientation by which is meant typically within 30° of a true vertical axis. It is preferred in practicing the invention that the engaged length between male and female members, L for FIG. 1, be at least three-eighths inch, preferably from three-eighths to five-eighths inch. This is a departure from normal practice wherein the engaged length ranges from one-eighth to three-sixteenths and sometimes up to one-fourth inch. The added engagement seems to enhance the effectiveness of the ultrasonic excitation.

The invention is useful in joining tubes of varying sizes although it is especially useful in joining tubes of nominal diameter ranging from three-sixteenths to three-fourths inch. By tubes is meant elongated members of hollow cylindrical configuration. The tubes may be in unalloyed aluminum or alloys commonly employed in making heat exchangers such as those containing manganese which alloys may be clad with another alloy. The filler alloys contemplated in practicing the invention include the known solder filler alloys useful in joining aluminum, both of the so-called high and low temperature variates typical compositions being shown in the table below.

Solder Filler Alloys

| Temperature Type | Liquidus Temperature | Nominal Composition | | | |
|---|---|---|---|---|---|
| | | Pb | Sn | Zn | Al |
| Low | 490 | 63 | 34 | 3 | – |
| Low | 395 | – | 91 | 9 | – |
| High | 725 | – | – | 95 | 5 |
| High | 700 | – | 35 | 65 | – |

While the invention is especially suitable for making solder joints using filler alloys of the type described above it should also be useful in making brazed joints wherein the filler alloy is an aluminum base alloy which melts at somewhat higher temperatures, usually over 1,000° F. For the most part these alloys contain 5 percent or more silicon and some amount of copper, zinc and other additions along with at least 75 percent aluminum.

The invention contemplates no critical cleaning steps although the degreasing and other conventional cleaning steps common to good joining practice are applicable in practicing the invention. For instance, the members should be cleaned of any grease which can be effected by immersion in an organic solvent such as acetone. If, for some reason, either member has a thick or dense oxide coating it is advisable that such be removed as is the case in other joining techniques.

The ultrasonic energy contemplated in practicing the invention is of the type normally used in non-destructive testing, ultrasonic welding and the like wherein the frequency normally ranges from about 1,000 to 100,000 cycles per second and the stroke, end to end, from about 0.00001 to 0.010 inch under load.

While the invention has been described in terms of preferred embodiments, the claims appended hereto are intended to encompass all embodiments which fall within the spirit of the invention.

What is claimed is:
1. A method of fluxless joining of aluminum tubes comprising:
   1. bringing into socket engagement a male and female aluminum tube member to provide a lapped socket joint configuration, the annular gap between said male and female members being 0.002 to 0.006 inch substantially around the entire periphery of said gap, the joint being oriented in a substantially vertical direction with the entrance to the female member pointing substantially upwardly,
   2. positioning at the said upwardly facing entrance end of said female portion a supply of joining filler alloy,
   3. bringing said joint and said filler alloy to joining temperature which melts the joining alloy but not the aluminum tube members,
   4. applying to said joint at said joining temperature positive multi-directional ultrasonic energy pulses to cause cavitation of said molten filler alloy thereby to cause said filler alloy to disrupt the oxide coating and to wet the metal surfaces of said members engaged in said joint to progressively form a connecting bridge between said surfaces, and
   5. solidifying said filler alloy.

2. The method according to claim 1 wherein the axes of the tubes are positioned within 30° of a true vertical axis.

3. The method according to claim 1 wherein the ultrasonic energy pulses are applied in a substantially horizontal plane.

4. The method according to claim 1 wherein the engaged length of said joint is at least three-eighths inch.

5. The method according to claim 1 wherein the engaged length of said joint is from three-eighths to five-eighths inch.

6. The method according to claim 1 wherein said tubes range from three-sixteenths to three-fourths inch in diameter.

7. The method according to claim 1 wherein the female portion of said joint is an expanded portion of a tube having a cross section substantially identical with that of the male member.

8. The method according to claim 1 wherein said filler alloy is provided in the form of an insert shaped to fit within the space defined by the outer periphery of the male member and a flared opening provided at the upper end of the female portion.

9. The method according to claim 1 wherein the ultrasonic energy pulses are provided by a means having two prongs spaced to engage opposite outer faces of said joint.

* * * * *